United States Patent Office 3,816,600
Patented June 11, 1974

3,816,600
METHOD OF MANUFACTURING METAL FLUORIDES AND METAL FLUORIDE MIXTURES WHICH DO NOT COMPRISE OXYGEN
Albert Huizing, Emmasingel, Netherlands, and Johann Schroder, Aachen, Germany, assignors to U.S. Philips Corporation, New York, N.Y.
No Drawing. Filed Sept. 24, 1971, Ser. No. 183,670
Claims priority, application Netherlands, Sept. 25, 1970, 7014138
Int. Cl. C01d 11/02; C01g 9/04, 51/08
U.S. Cl. 423—489
3 Claims

ABSTRACT OF THE DISCLOSURE

Manufacture of metal fluorides which contain less than 0.01% by weight of oxygen. The metal fluorides to be purified are treated in a molten state in an inert atmosphere with ammonium fluoride and/or ammonium bifluoride.

---

The invention relates to the preparation of metal fluorides and mixtures of metal fluorides which are free of oxygen in the form of compounds such as the oxides, hydroxides and carbonates of the relevant metals, and of chemically or physically bound water, in which such metal fluorides or mixtures of metal fluorides which are not free from oxygen are treated with ammonium fluoride and/or ammonium bifluoride.

For a plurality of uses it is desired to have available metal fluorides free of oxygen present in the form of oxidic compounds and of water.

It is known that metal fluorides can be purified by passing anhydrous hydrogen fluoride gas through a melt of the relevant metal fluorides.

This method is rather cumbersome and makes it necessary to render the hydrogen fluoride gas to be used anhydrous. For this reason and due to the aggressive character of hydrogen fluoride, part of which disappears unused in the atmosphere, this method is not very attractive, particularly when large quantities of metal fluorides are to be purified of oxygen present therein as oxygen-containing compounds and chemically or physically bound water. It has also been proposed to purify metal fluorides by treatment with ammonium fluoride and ammonium bifluoride. In this case, the metal fluoride is intimately mixed with ammonium fluoride or ammonium bifluoride and is subsequently heated. The ammonium fluoride then decomposes and evaporates completely from the mixture at temperatures of between 200° and 300° C. Experiments have shown, however, that even when purification is performed in an oxygen-free atmosphere, the total content of oxygen in percent by weight cannot be brought below 0.1%.

Large quantities of metal fluorides, particularly lithium fluoride and eutectic mixtures of sodium fluoride or lithium fluoride and magnesium fluoride (77 mol percent LiF+23 mol percent $MgF_2$ and 67 mol percent LiF+33 mol percent $MgF_2$) must be used in heat accumulators which are used in combination with hot-gas engines. LiF and the said eutectic mixtures are very suitable for this purpose, because a large part of the heat energy stored in such heat accumulators is available as latent heat of fusion in a temperature range of between 700 and 900° C. (melting point LiF 848° C., melting point 77 mol percent NaF±23 mol percent $MgF_2$: 830° C.; melting point 67 mol percent LiF+33 mol percent $MgF_2$: 742° C.). For technical and heat-technical reasons this temperature range is very attractive for this purpose.

However, it has been found that when using these materials it is desirable that they are free from oxygen and do not contain water if they are present in sealed vessels. When, for example, technical lithium fluoride is used in this manner, high pressures occur in the vessels after several temperature cycles and sometimes even after one temperature cycle, while the molten material is found to have attacked the material of the vessel very aggressively so that the walls of the vessel are seriously weakened. The occurrence of explosions in case of using these vessels over a long period is not imaginary under these circumstances.

Furthermore, for an efficient operation of a heat accumulator comprising a metal fluoride or mixture of metal fluorides, it is necessary that the used metal fluorides are free from oxygen-containing compounds of the relevant metals, which compounds are insoluble in the melts of the relevant metal fluorides.

Lithium oxide, which as such is present in lithium fluoride or is formed during use in the heat-accumulator from lithium hydroxide and/or lithium carbonate present in the lithium fluoride does not dissolve in molten lithium fluoride. It does not melt until temperatures of more than 1700° C. are attained. In a heat accumulator lithium oxide has the tendency to deposit on those parts which are in heat-exchanging contact with the device to which energy in the form of heat is supplied by the heat accumulator. As a result the transfer of heat to this device is inhibited.

Also for other uses, for example, the manufacture of single crystals of, for example, $ZnF_2$, $MnF_2$, $CoF_2$, $CoF_3$ it is desirable to have oxygen-free starting products.

An object of the present invention is to provide a method of manufacturing oxygen-free metal fluorides. In this connection oxygen-free is to be understood to mean an oxygen content which is smaller than 0.01% in percent by weight.

It is evident that methods cannot be used for this purpose, in which in any stage of the method the metal fluoride to be purified is contacted with water or water-containing compounds, or is dissolved in water.

It is likewise evident that it is desirable to have a method of purifying metal fluorides in which it can be determined in a simple manner and without time-consuming chemical analyses, whether the envisaged purification has advanced far enough.

It was found that these objects are satisfied by a method of preparing oxygen-free metal fluorides and mixtures of metal fluorides which is characterized in that the metal fluoride or the mixture of metal fluorides is heated to a temperature above the melting point in an oxygen-free atmosphere, and that ammonium fluoride and/or ammonium bifluoride is subsequently added to the melt, which was previously not clear, has become clear.

The ammonium fluoride and/or ammonium bifluoride used in the method according to the invention may be of a technical quality.

The method may be applied in principle to all known metal fluorides. The method may be performed both with single metal fluorides and mixtures of metal fluorides.

The method according to the invention is not limited to the purification of the fluorides of those metals whose oxidic compounds have a smaller specific gravity than fluoride. It was found that the fluorides of metals for which the contrary is the case and for which the oxidic compounds therefore do not concentrate on the surface of the fluoride melt are also freed from oxygen by means of the method according to the invention. In fact, such turbulence is found to occur in the melt that the impurities are equally distributed through the melt. When adding ammonium fluoride and/or ammonium bifluoride, the oxygen compounds are continuously converted at the surface into fluorides. This process may be speeded up by increasing the turbulence in the melt in accordance with a preferred embodiment by passing an oxygen-free inert gas through the melt, such as nitrogen or argon which contains less than $5.10^{-4}$ percent by volume of oxygen.

The turbulence may be further increased by heating the melt by means of an electrical field of high frequency.

If the clarity of the melt cannot be checked clearly or when this is not to be used as a criterion, the same effect may be obtained by adding to the melt such a quantity of ammonium fluoride or ammonium bifluoride that the quantity of fluoride introduced in the melt is approximately the one to ten-fold quantity of oxygen present in the starting product in gram atoms.

The invention will be further described with reference to the following embodiment which relates to the manufacture of oxygen-free lithium fluoride for use in a heat accumulator, in which lithium fluoride is present in a sealed vessel.

EXAMPLE 3.8 kgs. of lithium fluoride containing 0.5% by weight of oxygen in the form of water and oxygen-containing compounds of lithium were heated to 860° C. under nitrogen. Nitrogen was passed through the melt. Small portions of ammonium fluoride were regularly added to the unclear melt, while a new portion was introduced when the previous portion had disappeared by evaporation and reaction with the impurities. After approximately 0.3 kg. of ammonium fluoride had been added in this manner, it was found that a clear melt was obtained. Lithium fluoride after cooling was found to contain less than $10^{-4}$ percent by weight of oxygen. It may be melted and cooled several times in a sealed vessel without an increase of pressure in the vessel and without corrosion occurring. Lithium fluoride which was used as a starting product in this example is not suitable for this purpose. By melting lithium fluoride, several times in advance, no improvement was obtained, for after several times of melting and cooling in a sealed vessel, pressures of up to 40 atmospheres were found to occur in the vessel and approximately one fourth of the wall thickness was found to have locally disappeared so that a serious weakening occurred. The vessel consisted of a chrome-nickel alloy (Inconel-600, trademark of the firm Henry Wiggin Company Ltd.). After some time it was no longer suitable for the envisaged purpose when using technical lithium fluoride.

What is claimed is:

1. A method of preparing metal fluorides and mixtures of metal fluorides free of oxygen in the form of the oxides, hydroxides and carbonates of the relevant metals and chemically or physically combined water, said method comprising heating a metal fluoride or mixture of metal fluorides that is not free of oxygen above the melting point in an oxygen free atmosphere to provide a turbulent cloudy melt and then adding to said cloudy melt at least one member of the group consisting of ammonium fluoride or ammonium bifluoride until the cloudy melt has become clear thereby converting oxygen compounds at the surface of said melt into fluorides.

2. The method of claim 1 wherein the turbulence of the melt is increased by passing an inert gas through the melt.

3. The method of claim 1 wherein the metal fluoride or mixture of metal fluorides is heated by means of a high frequency electrical field to provide a melt of high turbulence.

References Cited

UNITED STATES PATENTS

| 2,233,465 | 3/1941 | Adamoli | 423—489 |
| 2,804,372 | 8/1957 | Morana et al. | 423—489 |
| 3,366,444 | 1/1968 | Laferty, Jr., et al. | 423—490 |
| 3,565,700 | 2/1971 | Root | 423—490 |

EDWARD STERN, Primary Examiner

U.S. Cl. X.R.

423—464, 490; 252—70